United States Patent
Hershey et al.

(10) Patent No.: US 9,048,942 B2
(45) Date of Patent: Jun. 2, 2015

(54) METHOD AND SYSTEM FOR REDUCING INTERFERENCE AND NOISE IN SPEECH SIGNALS

(71) Applicant: Mitsubishi Electric Research Laboratories, Inc, Cambridge, MA (US)

(72) Inventors: John Hershey, Winchester, MA (US); Meng Yu, San Jose, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 328 days.

(21) Appl. No.: 13/690,201

(22) Filed: Nov. 30, 2012

(65) Prior Publication Data

US 2014/0153742 A1 Jun. 5, 2014

(51) Int. Cl.
  *H04B 15/00* (2006.01)
  *H04R 3/00* (2006.01)
(52) U.S. Cl.
  CPC ............... *H04B 15/00* (2013.01); *H04R 3/005* (2013.01); *H04R 2430/25* (2013.01)
(58) Field of Classification Search
  None
  See application file for complete search history.

(56) References Cited

U.S. PATENT DOCUMENTS

| | | | |
|---|---|---|---|
| 2004/0193411 A1* | 9/2004 | Hui et al. ...................... | 704/233 |
| 2008/0101622 A1* | 5/2008 | Sugiyama ...................... | 381/66 |
| 2008/0175408 A1* | 7/2008 | Mukund et al. ............... | 381/94.7 |
| 2010/0171662 A1* | 7/2010 | Sugiyama ...................... | 342/378 |
| 2011/0182437 A1* | 7/2011 | Kim et al. ...................... | 381/73.1 |
| 2012/0093333 A1* | 4/2012 | Hu et al. ........................ | 381/71.7 |
| 2013/0039503 A1* | 2/2013 | Beaucoup et al. ............. | 381/66 |
| 2013/0208896 A1* | 8/2013 | Chatlani et al. ............... | 381/17 |
| 2014/0056435 A1* | 2/2014 | Kjems et al. .................. | 381/71.1 |
| 2014/0119568 A1* | 5/2014 | Yu et al. ........................ | 381/92 |

OTHER PUBLICATIONS

L. Tong, G. Xu, T. Kailath, "Blind identification and equalization based on second order statistics: A time domain approach", IEEE Information Theory, 40(2):340-349, 1994.
W. Yin, S. Osher, D. Goldfarb, and J. Darbon. "Bregman iterative processs for compressed sensing and related problems", SIAM J. Imaging Sciences 1(1):143-168, 2008.
ITU-T Rec. P. 862, Perceptual evaluation of speech quality (PESQ), an objective method for end-to-end speech quality assessment of narrowband telephone networks and speech codecs, International Telecommunication Union, Geneva, 2001.

* cited by examiner

*Primary Examiner* — Thang Tran
(74) *Attorney, Agent, or Firm* — Dirk Brinkman; Gene Vinokur

(57) ABSTRACT

Interference in an audio signal is reduced by estimating a target signal using beam-forming in a direction of the signal source. A set of estimates of interference is determined by using a microphone array filtering matrix to block the target signal in the audio signal. A set of filters is optimized by minimizing an objective function measuring a mismatch between the set of estimates of interference and the estimate of the target signal. The minimizing uses a sparse regularization of coefficients of the set of filters. The set of estimates of interference are filtered using the set of filters after the optimizing. Then, the estimate of interference after the optimizing is subtracted from the target signal.

6 Claims, 6 Drawing Sheets

Input: Received mixed signals, $x_i, i = 1, 2$

Output: Non-overlapping speech segments.

Frame setting: Divide the whole utterance $x_i, i = 1, 2$ into overlapped frames with uniform length.

Filter estimation: Apply split Bregman method to (7) and obtain filters $u_i^k, j = 1, 2$ in each frame $k$

Cross-channel cancellation: Calculate $\hat{s}_k = u_2^k * x_1 - u_1^k * x_2$ for the whole utterance.

Normalization: $x_i \leftarrow \frac{x_i}{\|x_i\|_2}$ and $\hat{s}_k \leftarrow \frac{\hat{s}_k}{\|\hat{s}_k\|_2}$

Energy ratio: Restricted in frame $k$, $R_k = \frac{\|x_{i,k}\|_2^2}{\|\hat{s}_k\|_2^2}$, $i = 1$ or $2$.

Non-overlapping durations: Select the frame $k$ if $R_k > r_0$, where $r_0$ is the threshold.

*Fig. 7*

METHOD AND SYSTEM FOR REDUCING INTERFERENCE AND NOISE IN SPEECH SIGNALS

FIELD OF THE INVENTION

This invention relates generally to processing audio signals, and more particularly to cancelling interference in speech signals acquired by an antenna array.

BACKGROUND OF THE INVENTION

Speech-based command interfaces can be used in vehicles. Applications include automatic dialog system for hands-free phone calls, as well as more advanced features, such, as navigation systems.

However, interference, such as speech from the codriver, rear-seat passengers, and noise, e.g., music or radio, engine and wind noise, can significantly degrade performance of an automatic speech recognition (ASR) system, which is crucial for those applications. This issue can be addressed with adaptive interference cancellation techniques, such as generalized sidelobe cancellation (GSC).

Beamformers based on GSC are well known. Typically, the beamformer includes a presteering front end, a fixed beam former (FBF), a blocking matrix (BM) and an adaptive canceller. The presteering front end is composed of various time delays allowing the main lobe of the beamformer to be steered to a selected direction. The FBF is used to enhance a target signal from the selected direction. However, the BM, composed of adaptive blocking filters (ABF), rejects the target signal, so that the blocking matrix contains interference and noise. The adaptive canceller, composed of adaptive canceling filters (ACF), is able to adjust weights so that the interferences and noise can be subtracted from the fixed beamformer output.

However, the conventional adaptive beamformer for GSC, like the simple Griffiths-Jim beamformer (GJBF), see U.S. Patent Applications 20100004929, 20070244698, 20060195324 and 20050049864 D. suffers from target signal cancellation due to steering-vector errors. The steering-vector errors are due to errors in microphone positions, microphone gains and real world recordings of, e.g., reverberation, noise and a moving target. Indeed, the beamformer is constrained to produce a dominant response toward the selected location of the source of the speech, while minimizing the response in all other directions.

However, in reverberant environments a single direction of arrival cannot be determined because the desired signal and its reflection impinge on the microphone array from several directions. Thus, complete rejection of the target signal is almost impossible in the BM and a considerable portion of the desired speech is subject to interference cancellation, which results in target signal cancellation.

In addition, the original formulation of the GJBF was based on the general use of beamforming, where the far-field assumption is often valid, such as in radio astronomy or geology.

However, in a vehicle, the microphone array can span about one meter, meaning that the far field assumption is no longer valid. This change in the physics of the system also causes leakage in the conventional Griffiths-Jim BM because now the target signal is no longer received at each microphone with equal amplitude.

Applying the GSC uniformly to an entire utterance, without considering the observed data, is not efficient. It is not necessary to process noise only and single speaker segments using the GSC if they can be accurately labeled.

In particular, non-overlapping speech, and non-speech occur more often than overlapping speech, and each case needs to be handled differently

GSC

FIG. 1 shows a conventional GSC, which is a simplification of the well known Frost Algorithm. It is assumed that all input channels 101 have already been appropriately steered toward a point of interest. The GSC includes an upper branch 110, often called the Fixed Beamformer (FBF), and a lower branch 120 including a Blocking Matrix (BM) outputting to normalized least mean square modules 140, whose outputs are also summed 150.

The conventional Delay and Sum beamformer for FBF is to sum 130 the observed signals $x_m$ from the microphone array as $$y^{FBF}(t) = \frac{1}{M} \sum_{m=1}^{M} x_m(t-\tau_m), \tag{1}$$

where $\tau_m$ is the delay for the $m^{th}$ microphone, for a given steering direction.

The lower branch utilizes an unconstrained adaptive process on a set of tracks that have passed through the BM, including of some process intended to eliminate the target signal from the incoming data in order to form a reference of the noise. The particular Griffiths-Jim BM takes pairwise differences of signals, which can be expressed for a four-microphone instance as $$W_b = \begin{pmatrix} 1 & -1 & 0 & 0 \\ 0 & 1 & -1 & 0 \\ 0 & 0 & 1 & -1 \end{pmatrix} \tag{2}$$

For this $W_b$ the BM output tracks are determined as the matrix product of the BM and matrix of current input data $$y^{BM}(t) = W_b X(t) \tag{3}$$

where $X(t) = [x_1(t), x_2(t), \ldots, x_M(t)]$. The overall beamformer output y(t) 102, is determined as the DSB signal minus 160 the sum 150 of the adaptively-filtered BM tracks $$y(t) = y^{FBF}(t) - \sum_{m=1}^{M-1} \sum_{i=-K_L}^{K_R} g_{m,i}(t) y_m^{BM}(t-i). \tag{4}$$

Define, for m=1, ..., M−1

$$x_m(t) = (x_m(t+K_L), \ldots, x_m(t), \ldots x_m(t-K_R)),$$

and $$g_m(t) = (g_{m,-K_L}(t), \ldots, g_{m,0}(t), \ldots, g_{m,K_R}(t)),$$

then the adaptive normalized multichannel least mean square (LMS) solution is $$g_m(t+1) = g_m(t) + \frac{\mu}{p_{est}(t)} x_m(t) y(t); \quad (5)$$

$$m = 1, \ldots, M-1,$$

where $$p_{est}(t) = \sum_{m=1}^{M} \|x_m(t)\|_2^2. \quad (6)$$

SUMMARY OF THE INVENTION

The embodiments of the invention provide a system and method for reducing interference and noise in audio signals including speech using generalized sidelobe cancellation (GSC). In the preferred embodiment, the GSC is embedded in a multi-stage system designed to distinguish noise only segments (NO), single speaker segments (SS), and overlapping speech segments (OS), and then apply different approaches to suppress diffuse noises and other interferences within different types of the segments. In the overlapping speech segments, speech other than from a target speaker is considered interference.

A first stage is carried out by overlapping speech detection (OSD) and a voice activity detection, while the second stage is achieved by a blind speech separation (BSS) based speaker turn detection, direction of arrival estimation, sparse GSC and post-processing, i.e., log-spectral amplitude estimation.

BRIEF DESCRIPTION OF THE DRAWING

FIG. 7 is pseudo code for an overlapping speech detection process according to embodiments of the invention.

DETAILED DESCRIPTION OF THE PREFERRED EMBODIMENTS

Figure 5:
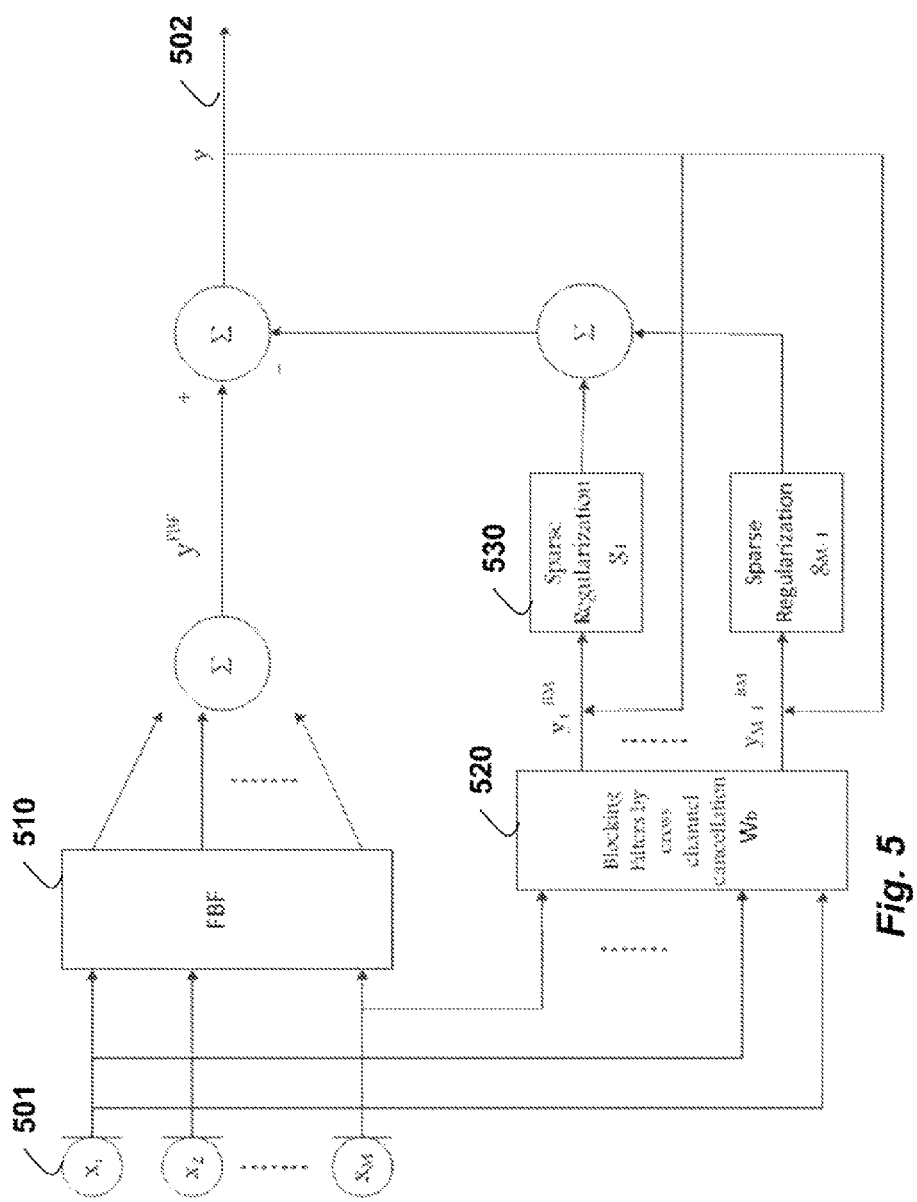
FIG. 5 is a schematic of a generalized sidelobe cancellation system according to embodiments of the invention.
Figure 6:
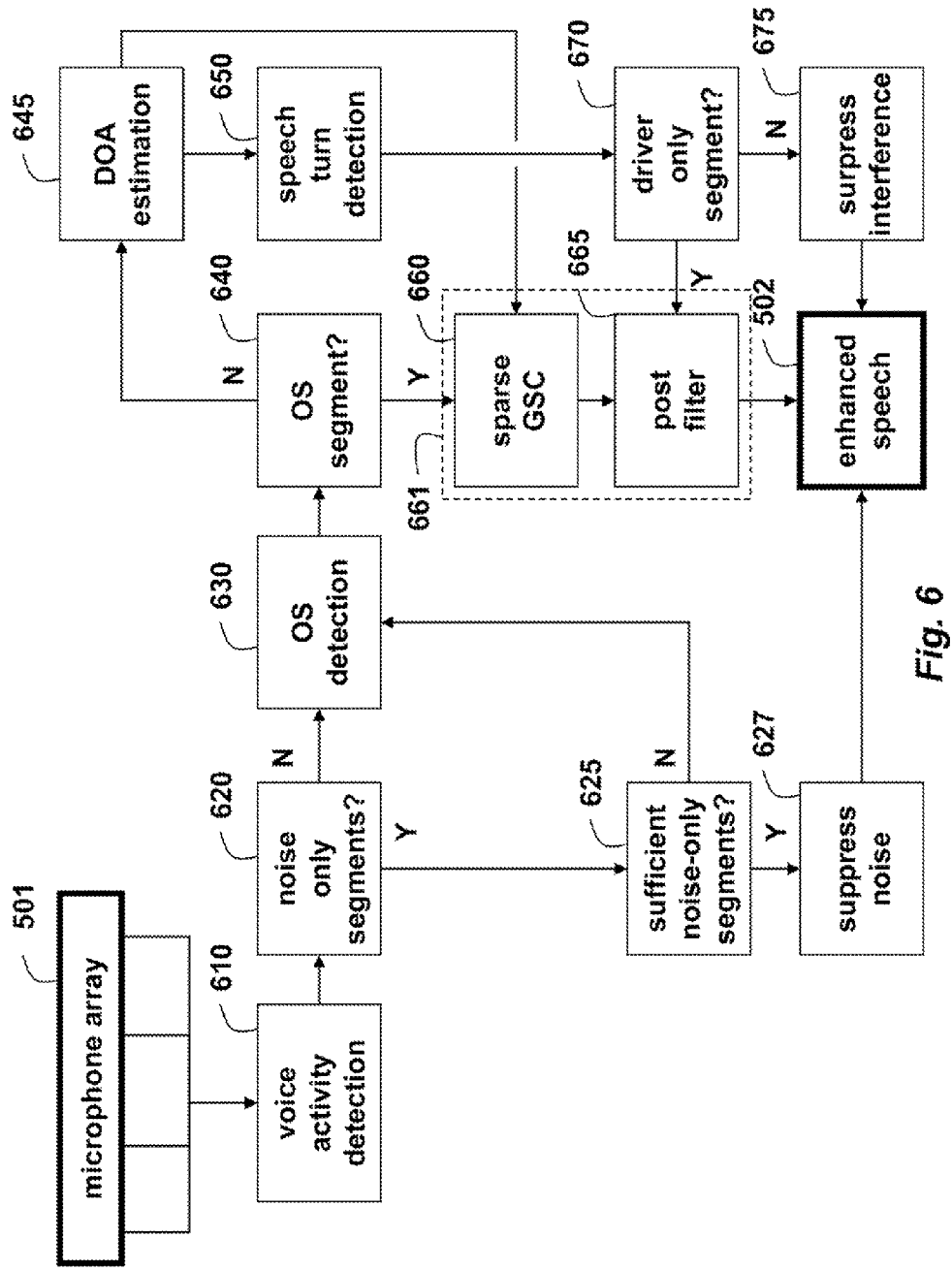
FIG. 6 is a flow diagram of a method for cancelling sidelobes according to embodiments of the invention.

The embodiments of the invention provide a system and method for reducing interference and noise in audio signals including speech using generalized sidelobe cancellation (GSC). The embodiments are shown in FIG. 5 and FIG. 6. FIG. 5 shows the system, and FIG. 6 the method. The method can be performed in a processor connected to a memory and input/output interfaces as known in the art.

Voice Activity Detection

In a first stage, a conventional voice activity detector (VAD) 610 can be used to determine when not to perform the GSC update, and instead directly suppress the noise, in noise only segments of speech. We use a modification to the discontinuity in the detection. Because VAD gives a 0/1 indicator, which signals speech muted and active, respectively. Both VAD errors and the speech activity's frequent changes would make the output speech discontinuous and uncomfortable if the detected non-speech parts are fully canceled by setting the non-speech parts to 0. However, long time non-speech parts can be fully cancelled without perceptual discomfort, while a short time non-speech part cannot. The voice activity detection is therefore followed by detecting 620 noise only segments. If there are a sufficient number of such segments 625 in a neighborhood of segments, the noise suppression 627 can be performed. Otherwise, proceed with overlapping speech (OS) detection 630.

Overlapping Speech Detection

In automatic overlapping speech (OS) detection (ASD) 640, there can be an array 501 of two or more microphones, and arbitrary number (N) of audio signal sources. The detection can be frame by frame on the observed data $x_i$ 501, i=1, 2 is the microphone index for any pair of microphones in the array. The observed data are obtained by audio signals acquired by the array of microphones.

In particular, the audio signal includes speech from a target source, i.e., a driver. The audio signal can also include noise, e.g., music and radio, interfering speech, etc., speech from sources other than the target.

The mixing model is $x_i(t)=\sum_{j=1}^{N} h_{ij}*s_j(t)$, where t is time, $h_{ij}$ is an impulse response from source $s_j$ to microphone i, which is a linear convolution. If $s_k$, $k \in \{1, 2, \ldots, N\}$ in a frame D is the only active source, then it follows from the mixing model that $$h_{2k}*x_1(t) - h_{1k}*x_2(t)=0 \text{ for } t \in D.$$

The elimination by cross-channel cancellation is known in blind channel identification. Based on the observed data in D, a pair of sparse filters $u_i$ (i=1, 2) are used to minimize the energy of $u_2*x_1 - u_1*x_2$ in the region D. Ideally, $u_1 \approx h_{1k}$ and $u_2 \approx h_{2k}$. The sparseness of the finite impulse response filters regularizes the solution and improves the accuracy of the method. Filter sparseness is achieved by $l_1$-norm regularization 530.

The resulting convex optimization problem for $t \in D$ is $$(u_1^*, u_2^*) = \quad (7)$$

$$\arg\min_{(u_1, u_2)} \frac{1}{2}\|u_2*x_1 - u_1*x_2\|_2^2 + \frac{\eta^2}{2}\left(\sum_{i=1}^{2} \mu_i(1) - 1\right)^2 + \mu(\|u_1\|_1 \|u_2\|_1),$$

where the second term $$\frac{\eta^2}{2}\left(\sum_{i=1}^{2} \mu_i(1) - 1\right)^2$$

is to fix scaling and prevent zero (trivial) solution.

Denote the length of D by $L_D$ and that of $u_i$ by L. The frame size of D can be set as short as 100 ms. As a result, this spatial difference based method solves the problem efficiently, in terms of the data usage, and is different from other OSD methods based on high order statistics of data.

Because the solution $u_i$ is $l_1$ regularized by solving Eq. 7, the filter length is effectively truncated to a size less than or equal to the length D supported by the data. In addition, sparseness forces the solution $u_i$ to be able to resolve the major spikes of the channel impulse response filters which comprise the relative time delay. In this sense, it helps to be insensitive and accurate under reverberant conditions. In matrix form, the convex objective of Eq. 7 becomes $$u^* = \underset{u}{\operatorname{argmin}} \frac{1}{2} \|Au - f\|_2^2 + \mu \|u\|_1 \quad (8)$$

where u is formed by stacking up $u_1$ and $u_2$; vector $f=(0, 0, \ldots, 0, \eta)^T$ with length $L_D+1$; and $(L_D+1) \times 2L$ matrix A (T is transpose) is $$A = \begin{pmatrix} x_1(1) & x_1(2) & \ldots & \ldots & x_1(L_D-1) & x_1(L_D) & \eta \\ & x_1(1) & \ldots & \ldots & x_1(L_D-2) & x_1(L_D-1) & 0 \\ & & \ddots & & & \vdots & \vdots \\ & & & x_1(1) & \ldots & x_1(L_D-L+1) & 0 \\ -x_2(1) & -x_2(2) & \ldots & \ldots & -x_2(L_D-1) & -x_2(L_D) & \eta \\ & -x_2(1) & \ldots & \ldots & -x_2(L_D-2) & -x_2(L_D-1) & 0 \\ & & \ddots & & & \vdots & \vdots \\ & & & -x_2(1) & \ldots & -x_2(L_D-L+1) & 0 \end{pmatrix}^T$$

with the indices of $x_1$ and $x_2$ restricted in D.

In each frame D, whether a SS frame or OS frame, we obtain an output signal $\hat{s}_D = u_2^{D*} x_1 - u_1^{D*} x_2$, where $u_i^D$ i=1, 2 are the optimal solution of Eq. 7 solved in D. Then for the whole utterance, $x_i$ (i=1 or 2) and $\hat{s}_D$ are normalized such that $l_2$ norm is 1. Finally the energy ratio restricted in D between normalized $x_i$ and $\hat{s}_D$ is calculated for detection as $$R_D = \frac{\|x_i|_D\|_2^2}{\|\hat{s}_D|_D\|_2^2}. \quad (9)$$

The cross-channel cancellation does not work if the frame D contains multiple sources, i.e., $\|\hat{s}_D|_D\|^2$ is not much smaller than $\|x_i|_D\|^2$. Hence, the significantly large values of this ratio resulting from the good performance of cross-channel cancellation indicate the non-overlapping speech frames.

Usually, we select the frames with the ratio larger than $r_0$ as the SS frames, where $r_0$ is a threshold value.

Figure 1:
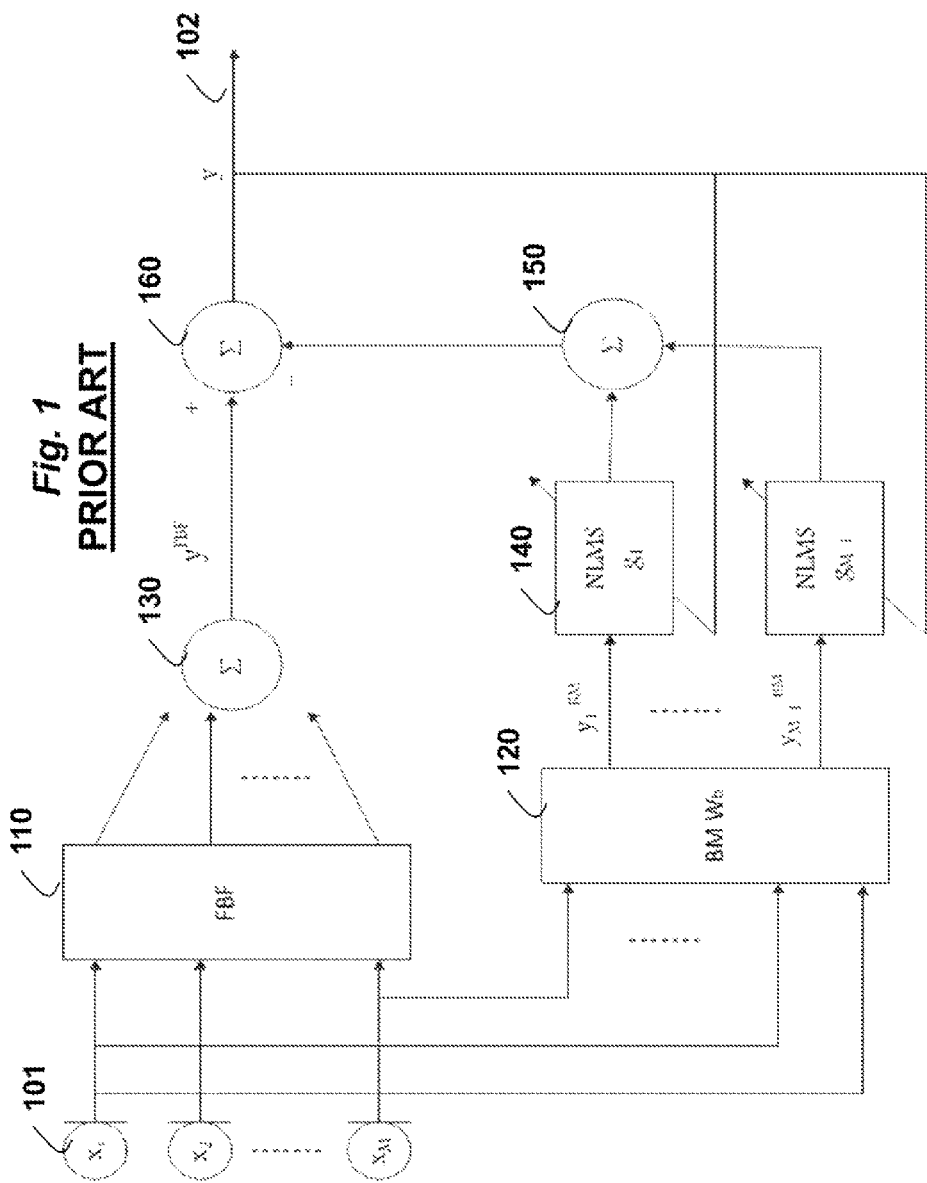
FIG. 1 is a schematic of a prior art generalized sidelobe cancellation system.
Figure 2:
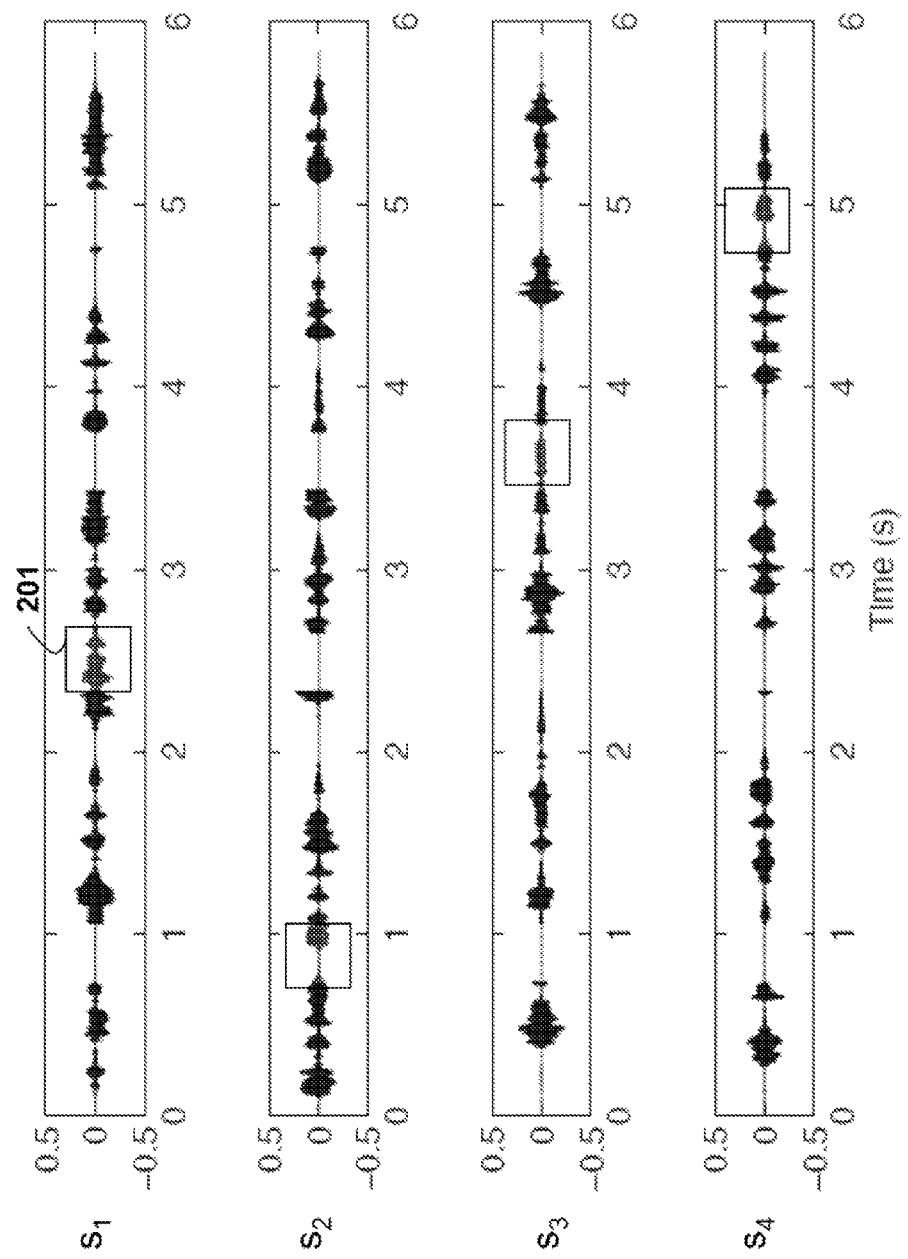
FIG. 2 are signal traces of recorded audio samples processed by embodiments of the invention.

FIG. 2 shows OSD on recorded audio samples. Two microphones receive a mixed audio signal from four sources ($s_1, \ldots, s_4$). The four sources with the parts marked 201 are for single speaker speech.

Figure 3:
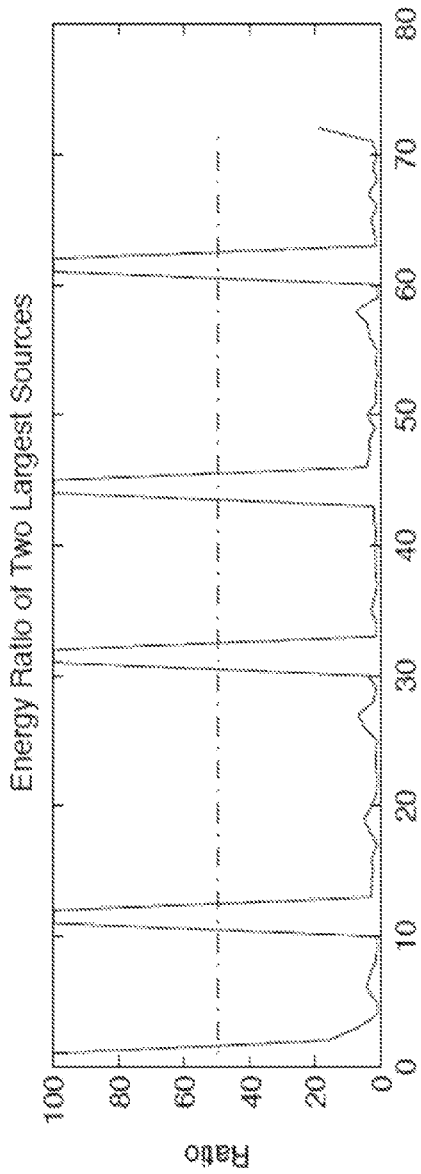
FIG. 3 and FIG. 4 are graphs of an energy ratio of a ground truth and an energy ratio for detection in each time frame, respectively.
Figure 4:
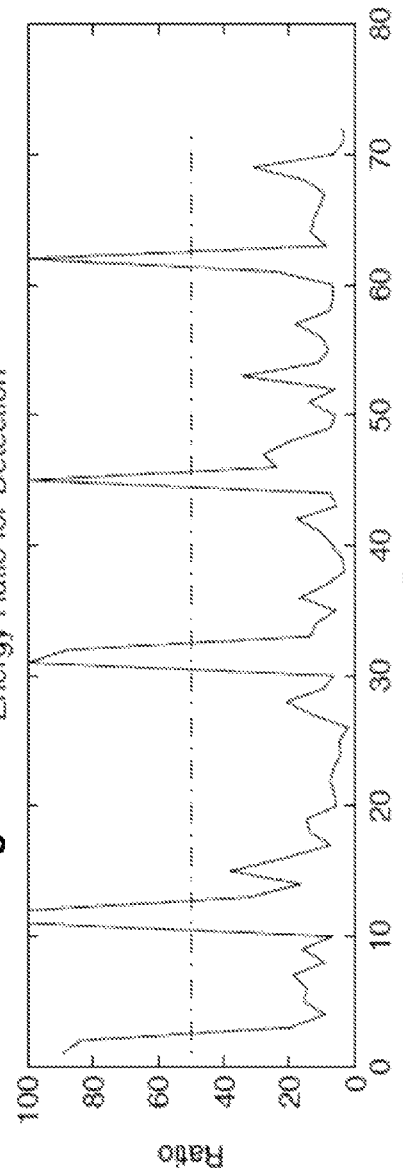

FIG. 3 and FIG. 4 show the energy ratio of the ground truth, and the energy ratio for detection in each time frame, respectively. The ratio of ground truth in each frame is the energy ratio between the source with the largest energy, and the source with second largest energy. The threshold is selected as 50.

The ratio of the ground truth indicates which frame contains only one active or a significantly dominant source, while the ratio of detection is the output of the process, which is used to determine whether a frame contains speech from a single speaker, or not. The detection ratios agree qualitatively with the ground truth.

FIG. 7 shows pseudo code for our OSD process. The variables and equations are described in detail above.

DOA Estimate

The delay of arrival (DOA) estimation 645 between each of the considered channel and the reference channel is repeated for two purposes. On one hand, the DOA estimate for the single speaker (SS) segments helps to select a period of speech to estimate the spatial difference from a vehicle driver 670 to the microphones, which is used to steer the array before our sparse GSC 660, and generate the BM as described below.

On the other hand, the DOA estimate helps speaker turn detection, see below, to select all the segments where only the driver is speaking 670. These segments are directly sent to the post-processing to surpress 675 interference, without being processed by our sparse GSC.

As used herein, sparsity is not a relative term, but rather a term of art. In signal processing and numerical analysis, a sparse signal or sparse matrix is primarily populated with zeros. In particular, signals are sparse when the signals contain many coefficients close to or equal to zero. Sparsity corresponds to systems that are loosely coupled. When storing and manipulating sparse matrices, it is beneficial and often necessary to use specialized processes and data structures that take advantage of the sparse structure of the matrix, as described herein.

To determine 645 the DOA between the reference channel and any other channel for any given segment, we estimate the DOA as the delay that causes the cross-correlation between the two signals segments to be a maximum. To improve accuracy in the case of reverberation, it is normal practice to use the Generalized Cross Correlation with Phase Transform (GCC-PHAT).

Sparse GSC

The signals discussed in this section (661) are all overlapping speech (OS), i.e., the target speech is interfered by other point audio sources. The observed signals from the microphone array is "steered" at the target using the FBF 510. The FBF is used to enhance a target signal from a selected direction to a target, e.g., the vehicle driver. The direction of the target source, before steering, is typically the angle between the line extending from the center of the microphone array projected through the target source, and a line connecting the microphones. This direction is estimated by the short time average DOA of the single speaker segments, which in some applications can be assumed to be in a restricted angular range. For example, this range might be [20°, 50°], when the microphone array is suspended from the upper windshield area of the car, in front of the driver and passenger seats, and laterally centered along the midline of the car, and angles are measured such that positive angles indicate the driver's side and negative angles indicate the passenger side. Conventional beamforming methods 120 assume that the target signal propagates through a known direct path. However, in applications such as speech acquisition in adverse acoustic environments, e.g., vehicles, the source signal propagates along a direct path, and unknown multi-path, subject to reverberation effects. In such cases, the target signal is often cancelled to some extent by conventional adaptive beamforming methods. This problem is especially serious for microphone arrays in strong reverberant environments, such as vehicles. The performance significantly degrades due to the reverberation effects.

Concerning the existence of reverberation effects, we use a novel channel model in the array processing. The spatial difference of the channel relating target source and two of the array elements is modeled as a pair of sparse filters to account for the reverberation effects.

The blocking matrix (filter) 520 is used to suppress the target signal but enhance the interference and noise. In the reverberant environment, because the signal components at different frequency bins have different response characteristics, the conventional blocking filter cannot block the target signal efficiently. When the target signal leaks into the multi-channel adaptive filter, it results in target signal cancellation.

Therefore, we modify the conventional BM 120 by including temporal information to block all the components of the target signal in our BM 520.

The GCC-PHAT is applied on the segments selected by the OSD, which confirms that these segments are due to a single point source. In the automotive environment, the driver's possible region is approximately [20°,50°]. Therefore, the segments with DOA in this range indicate the driver's speech. For the purpose of the computational efficiency, the OSD stops after the first driver only segment (denoted as $D_0$) is located.

Microphone i, i=1, 2, ..., M−1 is set as the reference channel, one by one, respectively. This optimization (Eq. 7) is called in $D_0$ for each pair of observed data $x_i$ and $x_{i+1}$, to obtain a pair of sparse filters $u_i^i$ and $u_{i+1}^i$, where the superscript i indicates that ith reference channel is involved in the optimization problem and the subscript indicates the estimated channel index. Eventually, $$y_i^{BM} = u_i^i * x_{i+1} - u_{i+1}^i * x_i \approx h_{i,k_0} * x_{i+1} - h_{i+1,k_0} * x_i = \sum_{j \neq k_0}(h_{i,k_0} * h_{i+1,j} - h_{i+1,k_0} * h_{i,j}) * s_j. \quad (10)$$

The source $s_{k_0}$, the only active source from driver in $D_0$, is eliminated in the entire utterance, provided that the acoustic environment does not change so that estimation of real impulse response from target $k_0$ to microphone i and i+1 ($h_{i,k_0}$ and $h_{i+1,k_0}$) during $D_0$ is still valid for the whole utterance.

The blocking filter $W_b$ 520 is constructed as $$W_b = \begin{pmatrix} u_2^1 & -u_1^1 & 0 & 0 \\ 0 & u_3^2 & -u_2^2 & 0 \\ 0 & 0 & u_4^3 & -u_4^3 \end{pmatrix}. \quad (11)$$

The output signal $y^{BM}$ of the blocking filter is $$y^{BM} = W_b * X. \quad (12),$$

where $X = (x_1; x_2; \ldots; x_M)$ is the steered signals and * is a linear convolution.

The output signal of the multichannel adaptive noise cancellation is $$y = y^{FBF} - \sum_{m=1}^{M-1} g_m * y_m^{BM}, \quad (13)$$

where $y_m^{BM}$ is m-th output of BM, m=1, 2, ..., M−1.

There is a trade-off between sufficiently determining the filter $g_m$ and the computation efficiency. A relatively long filter order, in which the number of coefficients in $g_m$ is large, degrades the efficiency of the iteration by the least mean square (LMS), while a relatively short filter $g_m$ that is less than the reverberation time of the vehicle (which may be 50 ms to 150 ms), cannot suppress all interference. With long filters of around 150 ms, sparse regularized convex optimization is incorporated and solved efficiently by the split Bregman method, see below.

Sparse regularization can be used to improve the estimation of the filters as follows. The optimal solution $g = (g_1; g_2; \ldots; g_{M-1})$ is obtained by minimizing the variance of beamforming output y with sparse regularization on the optimal solution g $$g^* = \min_g \left\| y^{FBF} - \sum_{m=1}^{M-1} g_m * y_m^{BM} \right\|_2^2 + \mu \sum_{m=1}^{M-1} \|g_m\|_1, \quad (14)$$

which can be rewritten with matrix form as (Eqn. 8) and implemented by the split Bregman method.

Furthermore, the output y of the sparse GSC corrects the reference of noise and interference $y^{BM}$ at the BM stage. For each m, m=1, 2, ..., M, cross cancellation is applied to $y_m^{BM}$ and y by solving $$(u_1^*, u_2^*) = \arg\min_{(u_1,u_2)} \frac{1}{2} \|u_2 * y_m^{BM} - u_1 * y\|_2^2 + \frac{\eta^2}{2}\left(\sum_{i=1}^{2} u_i(1) - 1\right)^2 + \mu(\|u_1\|_1 + \|u_2\|_1). \quad (15)$$

The noise and interference reference $y_m^{BM}$ is further updated by $$y_m^{BM} \leftarrow u_2 * y_m^{BM} - u_1 * y. \quad (16)$$

The sparse GSC is carried out by this loop updating $y^{BM}$ and y.

FIG. 5 shows our sparse GSC, which includes the FBF 510, the block filters 520, and the sparse regulizers 530, for input 501, and output 502.

It should be noted that the basic method can be performed iteratively until a termination condition is reached. In this embodiment, during each iteration, the filters are further optimized, and the interference and target signal are reestimated accordingly. The termination condition can be convergence of the filter parameters, or a fixed number of iterations.

Speaker Turn Detection

Speaker turn detection (STD) 650 is used on the observed speech data for which different point sources are active in turn. Distinguishing speakers by DOA estimation could be used. However, the difference of the DOAs in a vehicle is sometime not significant, especially when a radio or a music player is on, or a passenger in back seat behind the driver is speaking.

In addition, the noise in the vehicle degrades the performance of the DOA estimation as well. Therefore, we use a more accurate method for STD, by an initial blind speech separation (BSS).

Without loss of generality, M sources are active in turn in the observed data $x_m$, m=1, 2, ..., M. By calling the BSS method independent vector analysis (IVA), output $z_m$, m=1, 2, ..., M are generated as the estimate of each point source.

We relax the criterion of convergence, and stopping iteration before sufficient convergence, to accelerate the processing. For each k, k=1, 2, ..., M, we normalize $z_k$ and $\Sigma_{m \neq k} z_m$ respectively such that $l_2$ norm is 1. The energy ratio between $z_k$ and $\Sigma_{m \neq k} z_m$ (normalized) is calculated frame by frame (frame index j) as $$R^k(j) = \frac{\|z_k\|_j\|_2^2}{\left\|\sum_{m \neq k} z_m\right\|_j\|_2^2} \quad (17)$$

Though the DOA estimation is not accurate enough to segment the speech by speakers. By labeling each frame, it can be used to label $z_m$, m=1, 2, ..., M as whose speech is dominant in $z_m$. We need to locate the track $k_0$ where the driver's speech is dominant. Finally, the significantly large values in $R^{k_0}$ indicate driver-only frames. The rest frames are replaced by 0's.

Post-Filtering

Signals sent to post-filtering 665 are further enhanced by an optimally-modified log-spectral amplitude (OM-LSA) speech estimator, which performs well for non-stationary noise environment, such as car. The spectral gain function, which minimizes the mean-square error of the log-spectra, is obtained as a weighted geometric mean of the hypothetical gains associated with the speech presence uncertainty. The noise estimate is an average of previous spectral power values, using a smoothing parameter that is adjusted by the speech presence probability in subbands.

Implementation

The split Bregman method is an efficient tool for solving optimization problems involving total variation, or $l_1$ regularizations. The method solves the unconstrained problem:

$$\min_u J(\Phi u) + H(u),$$

where J is convex, but not necessarily differentiable such as the $l_1$ norm, H is convex and differentiable, and $\Phi$ is a linear operator. The idea of the split Bregman method is to introduce an auxiliary variable $d=\Phi_u$, and solve the constrained problem $$\min_{d,u} J(d) + H(u), \text{ s.t. } d = \Phi u.$$

This problem can be solved by the following iterations:

$$(u^{k+1}, d^{k+1}) =$$
$$\operatorname*{argmin}_{u,d} J(d) + H(u) - \langle p_d^k, d - d^k \rangle - \langle p_u^k, u - u^k \rangle + \frac{\lambda}{2}\|d - \Phi u\|_2^2$$
$$p_d^{k+1} = p_d^k - \lambda(d^{k+1} - \Phi u^{k+1})$$
$$p_u^{k+1} = p_u^k - \lambda\Phi^T(\Phi u^{k+1} - d^{k+1}),$$

where $\langle \cdot, \cdot \rangle$ is the inner product. For simplicity, we introduce a new variable $b^k = p_d^k/\lambda$, and note that $p_d^k = \lambda b^k$ and $p_u^k = -\lambda \Phi^T b^k$. Then $d^{k+1}$ and $u^{k+1}$ can be updated alternatively.

The general split Bregman iteration is $$d^{k+1} = \operatorname*{argmin}_d \frac{1}{\lambda} J(d) - \langle b^k, d - d^k \rangle + \frac{1}{2}\|d - \Phi u^k\|_2^2$$
$$u^{k+1} = \operatorname*{argmin}_u \frac{1}{\lambda} H(u) + \langle b^k, \Phi(u - u^k) \rangle + \frac{1}{2}\|d^{k+1} - \Phi u\|_2^2$$
$$b^{k+1} = b^k - (d^{k+1} - \Phi u^{k+1})$$

In the case of (Eqn. 8), $J(u)=\mu\|u\|_1$, $\Phi=I$, and $$H(u) = \frac{1}{2}\|Au - f\|_2^2.$$

The iterations are $$d^{k+1} = \operatorname*{argmin}_d \frac{\mu}{\lambda}\|d\|_1 - \langle b^k, d - d^k \rangle + \frac{1}{2}\|d - u^k\|_2^2 \quad (18)$$

$$u^{k+1} = \operatorname*{argmin}_u \frac{1}{2\lambda}\|Au - f\|_2^2 + \langle b^k, u - u^k \rangle + \frac{1}{2}\|d^{k+1} - u\|_2^2 \quad (19)$$

$$b^{k+1} = b^k - (d^{k+1} - u^{k+1}). \quad (20)$$

Explicitly solving Eqns. 18-19 yields a process

Initialize $u^0 = d^0 = b^0 = 0$

While $\|u^{k+1} - u^k\|_2 / \|u^{k+1}\|_2 > \varepsilon$ (1) $d^{k+1} = \text{shrink}\left(u^k + b^k, \frac{\mu}{\lambda}\right)$ (2) $u^{k+1} = (\lambda I + A^T A)^{-1}(A^T f + \lambda(d^{k+1} - b^k))$ (3) $b^{k+1} = b^k - d^{k+1} + u^{k+1}$ end While The function "shrink" is a soft threshold function defined by $\text{shrink}(v,t) = (\tau_t(v_1), \tau_t(v_2), \ldots, \tau_t(v_{NL}))$ with $\tau_t(x) = \text{sign}(x)\max\{|x|-t, 0\}$. The matrix A is fixed, and we can precalculate $(\lambda I + A^T A)^{-1}$, then the iterations only involve matrix multiplication.

EFFECT OF THE INVENTION

The invention provides a system and method for generalized sidelobe cancellation (GSC). The method is particularly suited to complex audio environments, such as the interior of vehicles. There, interferences, such as speech from a codriver, rear-seat passengers, music or radio, engine and wind noise, can significantly degrade performance of an automatic speech recognition system.

The invention can be used with speech-based command interfaces in vehicles. Applications include automatic dialog system for hands-free phone calls, as well as more advanced features, such as navigation systems.

The issue of interference is addressed with adaptive interference cancellation techniques, i.e., generalized sidelobe cancellation (GSC), using sparse regularization techniques to improve its robustness.

The embodiments distinguishes noise only segments (NO), single speaker segments (SS), and overlapping speech segments (OS), and then apply different sub-approaches to suppress diffuse noises and other interferences within different types of segments.

A first stage is carried out by overlapping speech detection (OSD) and a voice activity detection, while the second stage is achieved by a blind speech separation (BSS) based speaker turn detection, direction of arrival estimation, sparse GSC and post-processing in the form of log-spectral amplitude estimation.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for reducing interference in an audio signal in a form of a microphone signal acquired by an array of microphones from a source, comprising the steps of:
   determining an estimate of a target signal by beam-forming the microphone signal in a direction of the source;
   determining a set of estimates of interference by using a microphone array filtering matrix to block the target signal in the microphone signal;
   optimizing a set of filters by minimizing an objective function measuring a mismatch between the set of estimates of interference, determined by the estimates of interference determining step, and the estimate of the target signal, wherein the minimizing uses a sparse regularization of coefficients of the set of filters;
   filtering the set of estimates of interference using the set of filters after the optimizing; and
   subtracting the set of estimates of interference, filtered by the filtering step, after the optimizing from the target signal, wherein the steps are performed in a processor.

2. The method of claim 1, wherein optimizing the sets of filters, estimating the interference and the target signal are performed iteratively until convergence.

3. The method of claim 1, further comprising:
   detecting non-speech in parts of the estimated target signal; and
   canceling the non-speech parts in the estimated target signal.

4. The method of claim 1, further comprising:
   detecting multiple sources of the audio signal, wherein the multiple sources includes the target source;
   estimating a direction of arrival of the audio signal from of each source; and
   canceling parts of the audio signal arriving from directions other than the target source.

5. The method of claim 1, wherein the objective function is $$C_1(g_1, g_2, \ldots, g_M) = \left\| y^{FBF} - \sum_{m=1}^{M-1} g_m * y_m^{BM} \right\|_2^2 + \mu \sum_{m=1}^{M-1} \|g_m\|_1,$$

wherein an output of a fixed beam-former (FBF) $y^{FBF}$ is canceled using N blocking matrix (BM) filter outputs $y_m^{BM}$ using N cancellation filters (g) $g_m$, for m=1, ..., N, and a sparse regularization term is $\mu$, and M is a number of the microphones, and N is a number of the cancellation filters g.

6. The method of claim 5, wherein a cancellation method refines the N blocking filter outputs according to a second objective function $$C_2(u_1, u_2) = \frac{1}{2}\|u_2 * y_m^{BM} - u_1 * y\|_2^2 + \frac{\eta^2}{2}\left(\sum_{i=1}^{2} u_i(1) - 1\right)^2 + \mu(\|u_1\|_1 + \|u_2\|_1),$$

wherein $y = y^{FBF} - \sum_{m=1}^{M-1} g_m * y_m^{BM}$ is the estimated target speech, $u_1$, and $u_2$, are filters, $\eta$ is a weight, and an $m^{th}$ blocking matrix output is refined according to $$y_m^{BM} \leftarrow u_2 * y_m^{BM} - u_1 * y.$$

* * * * *